United States Patent [19]
Curtet

[11] Patent Number: 5,715,186
[45] Date of Patent: Feb. 3, 1998

[54] DIGITAL PROCESSING DEVICE WITH MINIMUM AND MAXIMUM SEARCH INSTRUCTIONS

[75] Inventor: Joël Curtet, Fontaine, France

[73] Assignee: SGS-Thomson Microelectronics S.A., Saint Genis, France

[21] Appl. No.: 424,870

[22] Filed: Apr. 17, 1995

[30]     Foreign Application Priority Data

Apr. 19, 1994 [FR] France ................... 94 04656

[51] Int. Cl.$^6$ ................... G06F 7/00; G06F 7/02
[52] U.S. Cl. ................... 364/715.06; 340/746.2
[58] Field of Search ................... 364/715.06, 736, 364/745, 769; 340/146.2

[56]     References Cited

U.S. PATENT DOCUMENTS 4,967,349 10/1990 Kodama et al. ................... 364/200

FOREIGN PATENT DOCUMENTS

A-0181516 5/1986 European Pat. Off. ........ G06F 7/22
A-0292854 11/1988 European Pat. Off. ........ G06F 7/48

OTHER PUBLICATIONS

IBM Technical Disclosure Bulletin, vol. 29, No. 5, Oct. 1986 New York US pp. 1975–1978, "ALU Implementing Native Minimum/Maximum Function for Signal Processing Applications".

K. Hwang "Computer Arithmetic, Principles, Architecture and Design", 1979, John Wiley & Sons, New York pp. 70–75.

*Primary Examiner*—Chuong D. Ngo
*Attorney, Agent, or Firm*—Wolf, Greenfield & Sacks, P.C.; James H. Morris

[57]     ABSTRACT

A computation device comprising an arithmetic and logic unit with an accumulation register and a condition register to store information bits of a current operation in the arithmetic and logic unit comprises circuits to determine which one of two operands applied as inputs to the arithmetic and is the smallest or the greatest and comprises circuits to write the smallest or the greatest operand thus determined in the associated accumulator register.

7 Claims, 1 Drawing Sheet

DIGITAL PROCESSING DEVICE WITH MINIMUM AND MAXIMUM SEARCH INSTRUCTIONS

BACKGROUND OF THE INVENTION

1. Field of the Invention

The invention relates to a digital processing device with instructions dedicated to the determining of a minimum or a maximum. It can be applied to signal processors.

2. Discussion of the Related Art

In certain special-purpose applications (for example GSM digital telephony), it is necessary to determine the minimum or the maximum in a flow of operands. The time needed to make this search for a minimum or a maximum may cause a problem in real-time processing operations for which the time taken to process a stream of data must be smaller than the time taken to renew the stream of data.

Known signal processors, which are specialized in varying degrees, all have an arithmetic and logic unit to perform operations on one or two operands and at least one accumulator register used to store the result of the last operation computed by the arithmetic and logic unit notably to give this operand to the arithmetic and logic unit. Typically, this operand is stored and used by the arithmetic and logic unit for the next operation. The operands used by the arithmetic and logic unit may come from several sources, including generally a left-hand register and a right-hand register associated with the arithmetic and logic units, and the accumulator register. Information signals describing an operation in progress are output by the arithmetic and logic unit. The transfer of the result into the accumulator register is generally performed through a logic saturation circuit which makes it possible to avoid overflows and hence to reduce the risks of self-oscillation by limiting the result towards the most significant bits.

With an architecture such as this, the computation of the minimum or of the maximum between two operands calls for the use of a comparison involving several standard instructions, namely a subtraction and one or more conditional instructions. The arithmetic and logic unit performs a subtraction between the two operands. Conditional instructions are then performed on the different information bits delivered by the arithmetic and logic unit during the subtraction, such as, for example, the sign bit and different carry bits, to determine the greatest or the smallest operand and to transfer it into the accumulator register. Depending on the number of conditions to be taken into account (as a function of the digital representation used for the operands), at least two or three cycles of instructions per pair of operands are generally necessary. If there is only a very short processing time available to determine the minimum or the maximum in a flow of data, the amount of time taken to perform these two or three instruction cycles per pair of operands is far from negligible.

SUMMARY OF THE INVENTION

The invention is a digital processing device capable of processing computation of a minimum or a maximum of a pair of operands in only one instruction cycle.

In one aspect of the invention, the structure of a typical digital processing device is modified to perform the conditional tests and the loading into the accumulator register of the smallest operand or the greatest operand in parallel with the operation of subtraction between the operands carried out by the arithmetic and logic unit.

In another aspect of the invention, the structure of a typical digital processing device is modified without excessively affecting the value of the duration of an instruction cycle. Computation of the minimum or the maximum between two operands may be completed in only one instruction cycle with an instruction cycle that is as short as possible, In this aspect of the invention, a conditional circuit is used to determine the greatest or the smallest operand and to control the transfer of this greatest or this smallest operand into the accumulator register.

One aspect of the invention is a digital processing device for operands represented according to a binary format signed in two's complement mode and on n bits assigned a significance or place value ranging from 0 to n-1, comprising an arithmetic and logic unit and an accumulator register. The arithmetic and logic unit receives a first operand and a second operand respectively at a first input and a second input to perform a subtraction. The arithmetic and logic unit delivers, at an output, information bits relating to the operation performed. According to the aspect of the invention, the digital processing device has a conditional circuit to determine the greatest operand and the smallest operand respectively and a circuit to transfer the operand thus determined into the accumulator register the conditional circuit receives, from the arithmetic and logic unit, the sign bit of the result (the bit having the place value n-1), a first bit for the carrying of the bit having the place value n-2 to said sign bit and a second bit for carrying beyond the sign bit.

According to another aspect of the invention, the digital processing device has means to select the sense of the subtraction to be performed by the arithmetic unit, according to whether the operand to be determined is the greatest or the smallest one.

The conditional circuit delivers, at an output, a conditional command towards a first multiplexer. This first multiplexer switches either the first operand or the second operand to its output depending on the binary value of the conditional command. A second multiplexer receives the output of the first multiplexer at a first input and the output of the arithmetic and logic unit at a second input. It has its output coupled to the accumulator register to transfer the output of the first multiplexer into the accumulator register on an instruction from a control unit to compute the minimum or the maximum between the first operand and the second operand.

According to the invention, the conditional circuit has a first Exclusive-OR gate receiving, as inputs, the first carry bit and the second carry bit and a second Exclusive-OR gate receiving, as inputs, the output of the first gate and said sign bit and delivering the conditional command at output.

Preferably, the digital processing device has a logic saturation circuit at the output of the arithmetic and logic unit and the second multiplexer receives the output of the logic saturation circuit at its second input.

BRIEF DESCRIPTION OF THE DRAWINGS

Other features and advantages of the invention are presented in the following description, which is made by way of an example that in no way restricts the scope of the invention, with reference to the appended drawings of which.

DETAILED DESCRIPTION

Figure 1:
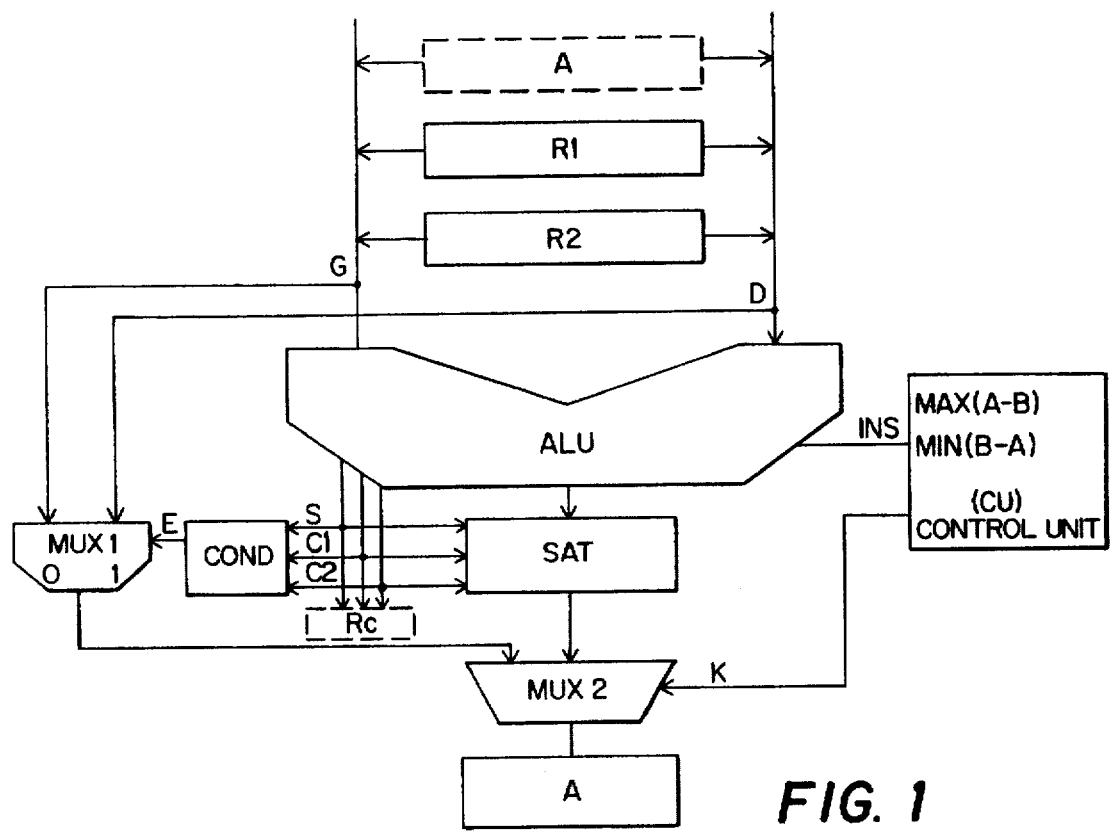
FIG. 1 shows a digital processing device according to the invention.

Referring now to FIG. 1, a digital processing device has a control unit (CU) that ensures the sequencing of the operations and manages the operation of the other elements of the device. Its complexity depends on the architecture of the device and on the arithmetic and logic functions envisaged.

The other elements that the digital processing device has, conventionally, are an arithmetic and logic unit ALU, an accumulator register A and source registers R1, R2 and a saturation logic circuit SAT.

The arithmetic and logic unit ALU may perform various operations such as operations of addition and subtraction, logical and arithmetic shifts, logic AND operations, logical OR operations, operations of comparison, incrementation, etc., depending on its complexity. It works on one or two operands that are given to it on a left-hand input G or a right-hand input D. These operands may be given, for example, by source registers R1 or R2 or, again, by the accumulator register A. It gives the result of the operation performed on an output OUT. This result is, as the case may be, transferred into the accumulator register A. It also delivers information bits on the operation performed. In general, these information bits are stored in a register of conditions Rc represented by a box of dashes in FIG. 1.

The arithmetic unit is controlled by the control unit CU which sends it an instruction code INS corresponding to the arithmetic and logic operation to be performed. It may also be controlled by a state register (not shown) containing, for example, the format of the operands for the current operation, when the arithmetic and logic unit is designed to be capable of working on several formats: signed operands, non-signed operands, integer or fractional format, on 8 or 16 bits, etc.

The logic saturation circuit SAT is placed between the output OUT of the arithmetic and logic unit and the accumulator register A and receives different information bits from the arithmetic and logic unit. These two information bits are: the two most significant carry bits and the sign bit of the result. Their decoding makes it possible, in the event of overflow, to saturate the result either to the lower limit or to the upper limit of the representation. For a 16-bit signed integer representation, the logic saturation circuit SAT thus saturates the result either to the value $-2^{15}$ or to the value $+2^{15}-1$.

The most common digital processing functions use these different circuits which are well-known to those skilled in the art and need not be described in greater detail.

The digital processing device has a conditional circuit to determine which of the two operands applied as inputs of the arithmetic and logic unit is the smallest or the greatest operand. It delivers a conditional command to be applied to a circuit to transfer the operand thus determined into the accumulator register A.

The circuit to transfer has a first multiplexer MUX1 and a second multiplexer MUX2.

The first multiplexer MUX1 receives, as inputs, the left-hand input G and the right-hand input D from the arithmetic and logic unit. Its output is connected to an input of the second multiplexer MUX2, a second input of which is given by the output of the logic saturation circuit SAT. The output of the second multiplexer is connected to the input of the accumulator register A.

The second multiplexer MUX2 is controlled by the control unit CU to switch either the output of the first multiplexer MUX1 or the output of the arithmetic and logic unit or, as the case may be, the output of the logic saturation circuit SAT according to the instruction INS sent to the arithmetic and logic unit. In particular, upon the instruction MIN for determining the smallest operand or upon the instruction MAX for determining the greatest operand, the control unit CU sends a command K to the second multiplexer MUX2 to switch the output of the first multiplexer MUX1 to the accumulator register A.

The first multiplexer MUX1 is for its part controlled by a conditional command E generated by the conditional circuit COND. Depending on the binary value, 0 or 1, of the conditional command, the multiplexer MUX1 switches the operand present at the left-hand input G or the operand present at the right-hand input D to output.

The conditional circuit prepares the conditional command E on the basis of the information bits given by the arithmetic and logic unit while it carries out the substraction between the two operands.

Figure 2:
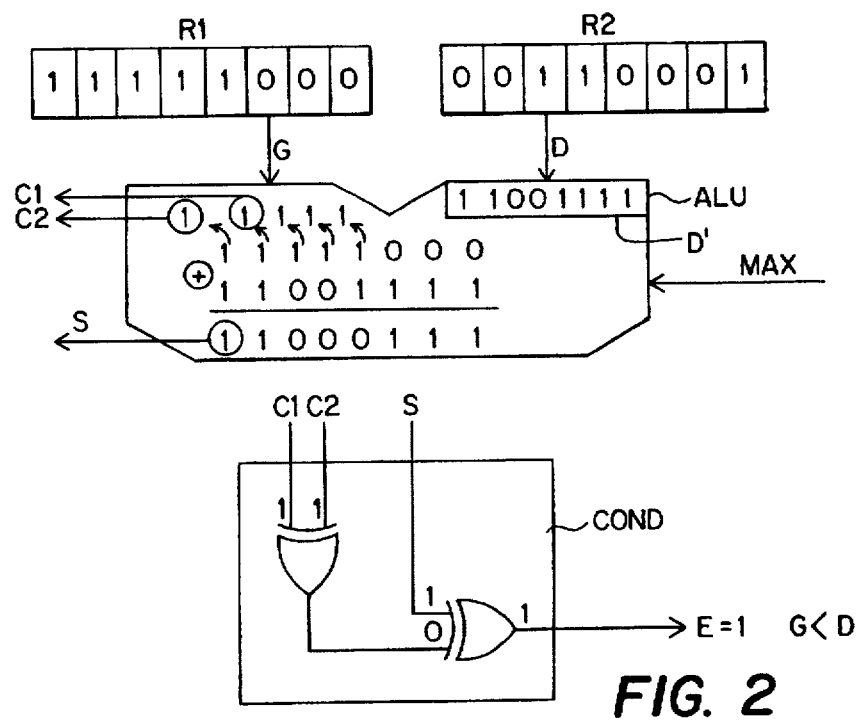
FIG. 2 shows a digital example of the preparation of the condition according to the invention.

For a fixed decimal representation signed in two's complement mode, these information bits are the sign bit S of the result and the two most significant carry bits C1 and C2. For a representation on n bits where the most significant bit (n-1) is the sign bit and where the least significant bit is the zero significant bit, the first carry bit C1 is the bit for carrying the bit having the place value n-2 to the sign bit S, and the second carry bit C2 is the bit for carrying beyond the sign bit S. Hereinafter, C1 shall be called the carry bit for carrying the most significant bit "-1" to the sign bit. These different information bits are shown in FIG. 2 in a numeral example. The carry bits can be used to determine the true sign of the result in the event of an overflow. In a simplified way, if the two carry bits are equal, there is no overflow and the true sign bit is the sign bit of the result. If the carry bits are different, there is an overflow and the true sign bit is the reverse of the sign bit of the result.

In the example of FIG. 2, the operands are shown in a signed 8-bit format. The sign bit is therefore the leftmost bit having the place value 7. The most significant bit "-1" as defined here above is the bit having the place value 6 to the right of the sign bit. The arithmetic unit carries out a subtraction between the left-hand operand and the right-hand operand. For this purpose, the arithmetic and logic unit first of all computes the two's complement D' of the right-hand operand, and then adds up the left-hand operand and the two's complement D'. In this addition, the carry bit C1 for carrying the most significant bit "-1" to the sign bit is equal to 1, the sign bit S of the result is equal to 1 and the carry bit C2 for the carry beyond the sign bit is equal to 1. The conditional circuit COND then prepares the conditional command E defined by the following logical equation:

$$E=(C1 \; XOR \; C2) \; XOR \; S$$

In the example of FIG. 2, the conditional command E is equal to 1, which means that the highest operand is the right-hand operand, the true sign of the result being negative. The multiplexer MUX1 then switches this right-hand operand over to its output. According to an aspect of the invention, the sense of the subtraction to be performed by the arithmetic unit depends on whether the operand to be determined is the greatest or the smallest one.

If we choose the binary logic seen with FIG. 2, namely the fact that a conditional command E equal to 1 means that the desired operand is the right-hand operand, then the instruction MAX for seeking the maximum corresponds, for the arithmetic and logic unit, to the subtraction of the right-hand operand to the left-hand operand (A-B), namely the addition between the left-hand operand and the two's complement of the right-hand operand. The instruction MIN for search-ing the minimum corresponds, for the arithmetic unit, in performing the subtraction of the left-hand operand to the right-hand operand (B-A), namely the addition of the two's complement of the left-hand operand to the right-hand operand this sensing allows a same conditional logic for both cases. Thus the conditional circuit is minimized and the propagation delay is reduced.

In a practical way, in a search for an extreme value, e.g., the minimum or maximum value, in a stream of operands, the accumulator register A will be used both as a source register and as a destination register: the accumulator register A will be initialized with a first operand and then, at each instance, the minimum or the maximum will be determined between the operand contained in the accumulator register A and a new operand presented by another source register, by an example by the register R1. The accumulator register is thus shown in dashes in FIG. 1 beside the other source registers R1 and R2.

This device is particularly advantageous because, through the carrying out of the conditional operations and operation for the transfer of the desired operand into the accumulation register A, in parallel on the arithmetic and logic unit and the saturation logic, the search operation is performed in a single instruction cycle. In other words, the circuitry used to determine the minimum or maximum between two input values defines a path from the inputs receiving these values to the output providing the minimum or the maximum, which path has a single clocked register, namely, the accumulation register.

Furthermore, this device is particularly simple for the user because the search for a minimum or a maximum is encoded in a single instruction.

Finally, as compared with a standard architecture with a logic saturation circuit, the instruction cycle is affected only by the transfer time of a multiplexer.

Indeed, the critical path without the device of the invention is given by:

$$t_{1critical} = t_{ALU} + t_{SAT}$$

And the critical path with the device of the invention is given by:

$$t_{2critical} = t_{ALU} + t_{COND} + t_{MUX1} + t_{MUX2}$$

Now, the passage into the saturation circuit SAT consists of an overflow test (decoding of the sign bit and of the two bits for the carrying of the most significant bits, and testing of the same type as the one done in the conditional circuit COND) and of the transfer to output of the result of the arithmetic and logic unit or of the saturated value (maximum or minimum value of the format).

We therefore have $t_{SAT}$ similar to $t_{COND} + t_{MUX1}$.

The instruction cycle time is therefore increased by the transfer time in the second multiplexer, giving an increase of the order of 3% in CMOS technology. In terms of circuit surface area, the architecture of the invention entails an increase of the order of 2% as compared with a standard architecture. For applications using these searches for minimum or maximum values, all this is negligible as compared with the gain in the number of instruction cycles needed to perform these searches and has little effect on costs.

Having now provided a detailed description of an embodiment of the invention, it should be apparent that the foregoing was merely illustrative, having been presented by way of example only. Numerous modifications of the disclosed device will be apparent to one of ordinary skill in the art. For example, the digital device may not include a logic saturation circuit. IN such an embodiment, the second multiplexer receives, at its second input, the output of the arithmetic and logic unit. The digital processing device may again comprise a rounding circuit at output of the arithmetic unit. Additionally, the digital processing device of the invention can be applied to different types of signed or unsigned binary representations with a possible adaptation of the conditional circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A digital processing device for comparing a first operand to a second operand, each represented in binary format and signed in two's complement mode and using n bits, wherein each bit is assigned a place value ranging from 0 to n-1, comprising:

an accumulator register;

an arithmetic and logic unit, receiving the first operand and the second operand respectively at a first input and a second input, for performing a subtraction operation thereon and delivering information bits related to the subtraction operation;

means for selecting an order of operands in the subtraction operation performed by the arithmetic and logic unit according to whether an operand to be selected is a minimum or maximum;

a conditional circuit for selecting one of the first and second operands according to the information bits from the arithmetic and logic unit and for providing a conditional command at an output; and means for transferring the selected operand into the accumulator register according to the conditional command.

2. The digital processing device of claim 1, embodied in an integrated circuit.

3. The digital processing device of claim 2, embodied in a digital telephony system.

4. A digital processing device according to claim 1, wherein the information bits include a sign bit defined by a place value n-1 of a result of the subtraction operation, a first carry bit representing a carry value from addition of bits at place value n-2 of the first and second operands and a second carry bit representing a carry value from addition of bits at place value n-1 of the first and second operands.

5. A digital processing device according to claim 4, wherein the conditional circuit comprises:

a first exclusive-OR gate receiving, as inputs, the first carry bit and the second carry bit and providing an output, and a second exclusive-OR gate receiving, as inputs, the output of the first exclusive-OR gate and the sign bit and delivering the conditional command.

6. A digital processing device according to claim 1, wherein the means for transferring comprises:

a first multiplexer receiving, at an input, the conditional command and switching one of the first operand and the second operand to an output according to the conditional command; and a second multiplexer receiving the output of the first multiplexer at a first input and an output of the arithmetic and logic unit at a second input, and having an output coupled to the accumulator register to transfer the output of the first multiplexer into the accumulator register when the arithmetic and logic unit computes one of a minimum and a maximum between the first operand and the second operand.

7. A digital processing device according to claim 6, further comprising:

a logic saturation circuit connected to the output of the arithmetic and logic unit, wherein the second multiplexer receives the output of the arithmetic and logic unit at its second input through the logic saturation circuit.

* * * * *